UNITED STATES PATENT OFFICE.

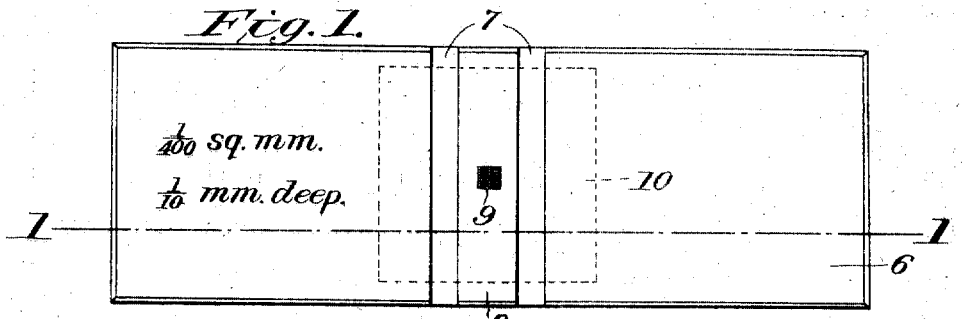
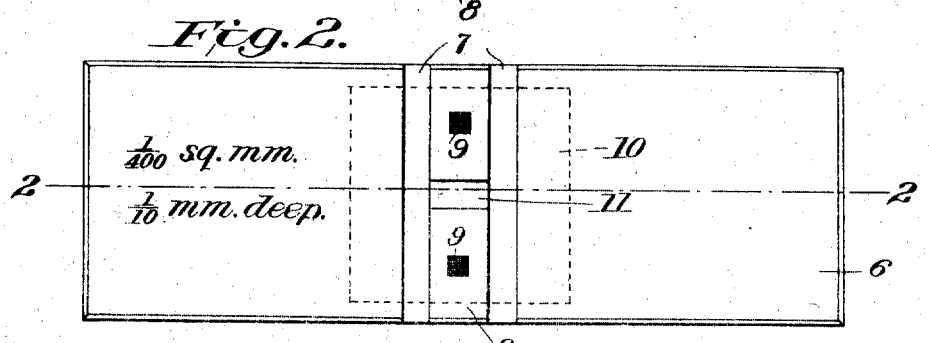
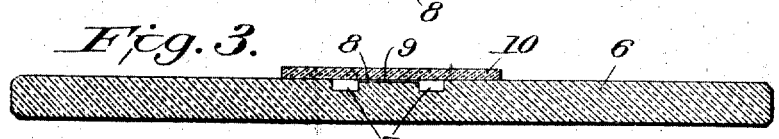
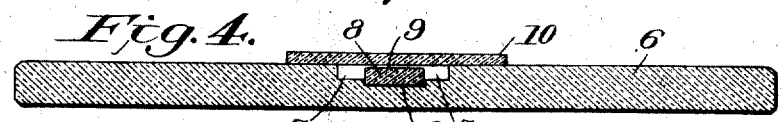
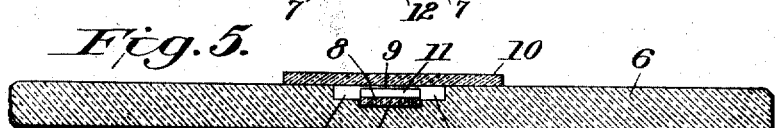
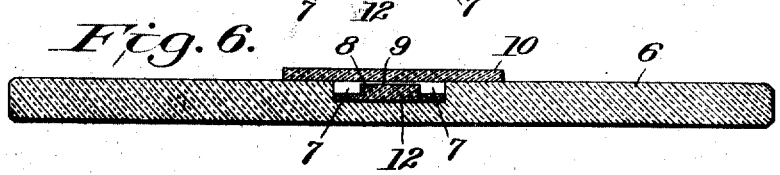

MAX LEVY, OF PHILADELPHIA, PENNSYLVANIA.

HÆMOCYTOMETER.

1,214,331.  Specification of Letters Patent.  Patented Jan. 30, 1917.

Application filed September 30, 1916. Serial No. 123,200.

*To all whom it may concern:*

Be it known that I, MAX LEVY, a citizen of the United States of America, residing at Philadelphia, in the county of Philadelphia and State of Pennsylvania, have invented certain new and useful Improvements in Hæmocytometers, of which the following is a specification.

This invention relates to hæmocytometers the object of my improvements being to provide such a device with a counting cell or chamber that is of greater average accuracy, as to the depth thereof and to obviate to a great extent or wholly the liability of separation of the scale member from its base, and to provide a construction in which the cover-plate will be supported by the slide or base. In other words it may be said that the purpose of this invention is to provide a hæmocytometer with a counting cell or chamber which will be positioned at a definite distance below the surface of the glass slide or base and in which the cover-plate will be supported directly by the surface of the slide or base. In the prior art hæmocytometers have been constructed in such a manner that the glass slide or base has attached thereto rests or supports for the cover plate which rests or supports are cemented to the surface of the slide or base, and between these rests or supports the cell or scale slip is cemented, in which construction the bottom of the gutter or gutters is formed by the face of the slide or base, and obviously the cell or scale slip and the support or supports for the cover-plate extend above the plane of the face of the slide or base and each piece is held in place by cement. With this form of construction the cell or scale slip may be provided with two counting scales. Another well known form of hæmocytometer that has a single cell or counting chamber comprises a base or slide upon which is mounted or attached by cement a square of glass having therethrough a circular opening and within this opening is located a smaller circular disk that has thereon the net or scale, this circular disk is also cemented to the base or slide and is surrounded by a continuous gutter. In use the cover-plate rests upon the apertured square and provides a counting chamber above the disk that has thereon the net or scale. A construction which includes a plurality of parts which are connected to the base or slide by cement involves a method of construction that includes several factors which are detrimental to the accuracy of the device and the resulting structure is one in which the cover-plate support or supports and the net or scale slip or disk are above the plane of the base or slide.

A characteristic of a hæmocytometer made to accord with my invention and by which I secure greater accuracy as to the average depth of the cell chamber, and practically eliminate liability of separation of the parts, resides in using the plane face of the base or slide as the support for the cover-plate and in positioning the cell chamber below the plane of the face of the base or slide.

In the accompanying drawings Figure 1 is a plan view of a hæmocytometer made to accord with my invention, the same having a single net or scale. Fig. 2 is a plan view of a modification, in which the base or slide is provided with two nets or scales. Fig. 3 is a longitudinal section, showing one form of my improvement. Fig. 4 is a longitudinal section on the line 1—1 of Fig. 1. Fig. 5 is a longitudinal section on the line 2—2 of Fig. 2, and Fig. 6 is a sectional view of a modification.

Referring primarily to Figs. 3, 4 and 5 of the drawings, the base or slide 6 is somewhat thicker than the plate usually selected for slides used for the same purpose, so that the average thickness of the slide will be the same as the usual thickness of hæmocytometers as heretofore constructed, and in such a plate there are formed transverse grooves or recesses 7, 7, the portion of the plate or slide between the grooves or recesses being reduced in thickness, such portion 8 having etched or ruled thereon a microscopic net or scale 9 which with the cover-plate 10 constitutes the counting chamber.

The embodiment of my invention in a form wherein the net or scale is formed upon an integral part of the plate is ideal except as to cost of manufacture, and when desired to provide the device with two nets or scales 9, 9, the counting chambers of the slide will be separated centrally by a groove or recess 11.

In constructing a hæmocytometer in which the scale or net slip or part 8 is not integral with the base or slide 6, the glass plate has formed therein a transverse groove or recess of adequate width and of sufficient depth to provide gutters or troughs which extend across the slide, and this transverse groove or recess is provided with a recess 12 to receive a net or scale slip 8, upon which is ruled the scale 9. The recess 12 and the slip 8 are of practically the same width and the slip is held in place by a film of cement of such character that a portion thereof may be removed by pressure upon the slip to provide the correct depth below the plane surface of the base and slide.

The thickness of the slip 8 upon which is ruled the net or scale 9, and the cement determines the depth of the cell or counting chamber. The side walls of the recess 12 between which the slip 8 is located not only correctly positions the slip but also affords protection for the cement against the fluids employed in counting, cleansing and sterilizing the hæmocytometer.

It will be particularly noted that the slide or base is transversely grooved or recessed for its full width to a depth sufficient to provide for the depth of the counting chamber, the slip of glass on which the net or scale is ruled, and a film of transparent cement, so that in assembling pressure applied to the scale-slip will determine the depth of the counting chamber accurately, irrespective of any inequality as to the depth of the recess or thickness of the scale-slip.

In the form or type of hæmocytometers shown by Fig. 6 of the drawings the scale-slip is of the full width of a transverse recess formed in the slide and is cemented to the face of the recess, and in this modification the gutters are formed by lowering or cutting away a portion of the scale-slip.

A hæmocytometer as herein set forth provides a counting chamber which is below the surface of the face of the slide and said counting chamber and the transverse gutters or grooves are in use both bridged by the cover-plate which rests upon the face of the slide, and owing to the lateral continuity of the counting chamber the capillary action after the cover-plate is put on is uniform and results in an even distribution of the corpuscles over the counting chamber.

I claim—

1. A hæmocytometer having its counting chamber positioned below the face of the slide, for use with a cover-plate that is supported by the slide to bridge the counting chamber.

2. A hæmocytometer comprising a glass slide having a counting chamber positioned below the plane of the face of the slide, recesses in the slide located alongside of the counting chamber and a cover-plate adapted to rest upon the face of the slide to bridge the counting chamber and the recesses.

3. A hæmocytometer comprising a slide in which is formed a transverse recess, a scale-slip cemented in the recess and maintained so that the face of the scale-slip will be below the plane of the face of the slide and a cover plate which is supported by direct engagement with the face of the slide to provide above the scale-slip a counting chamber.

4. A hæmocytometer comprising a slide in which is formed a recess, a scale-slip of less thickness than the depth of the recess which is cemented to the slide and maintained so that the face of the scale-slip will be below the plane of the face of the slide and a cover which is supported by direct engagement with the face of the slide beyond the recess to provide above the scale-slip a counting chamber.

5. A hæmocytometer comprising a slide in which is formed a transverse recess and a scale-slip receiving recess, a scale-slip cemented in the scale-slip receiving recess so that the face of the scale-slip will be maintained below the plane of the face of the slide, for use with a cover-plate that is supported by the face of the slide to bridge the scale-slip and the grooves adjacent to the sides of the scale-slip.

6. A hæmocytometer comprising a glass slide in which is formed a transverse recess and a deeper centrally located scale-slip receiving recess, a scale-slip maintained in the scale-slip receiving recess by cement, the quantity of cement and the thickness of the scale-slip being such as to position the face of the scale-slip below the plane of the face of the slide to provide with a cover-plate that is maintained directly upon the face of the slide a counting chamber.

7. A hæmocytometer comprising a glass slide in which is formed a recess, a glass scale-slip provided on its surface with a ruled scale, a film of cement for maintaining the scale-slip in place the combined thickness of the scale-slip and the film of cement being such as to position the scale-slip below the face of the slide to provide a counting chamber, and gutters on each side of the counting chamber.

MAX LEVY.